March 5, 1963

J. G. CLARY 3,079,712

MEDIA DISPLAY APPARATUS

Filed March 13, 1961

INVENTOR
JOHN G. CLARY
BY
ATTORNEY

INVENTOR
JOHN G. CLARY
BY
ATTORNEY

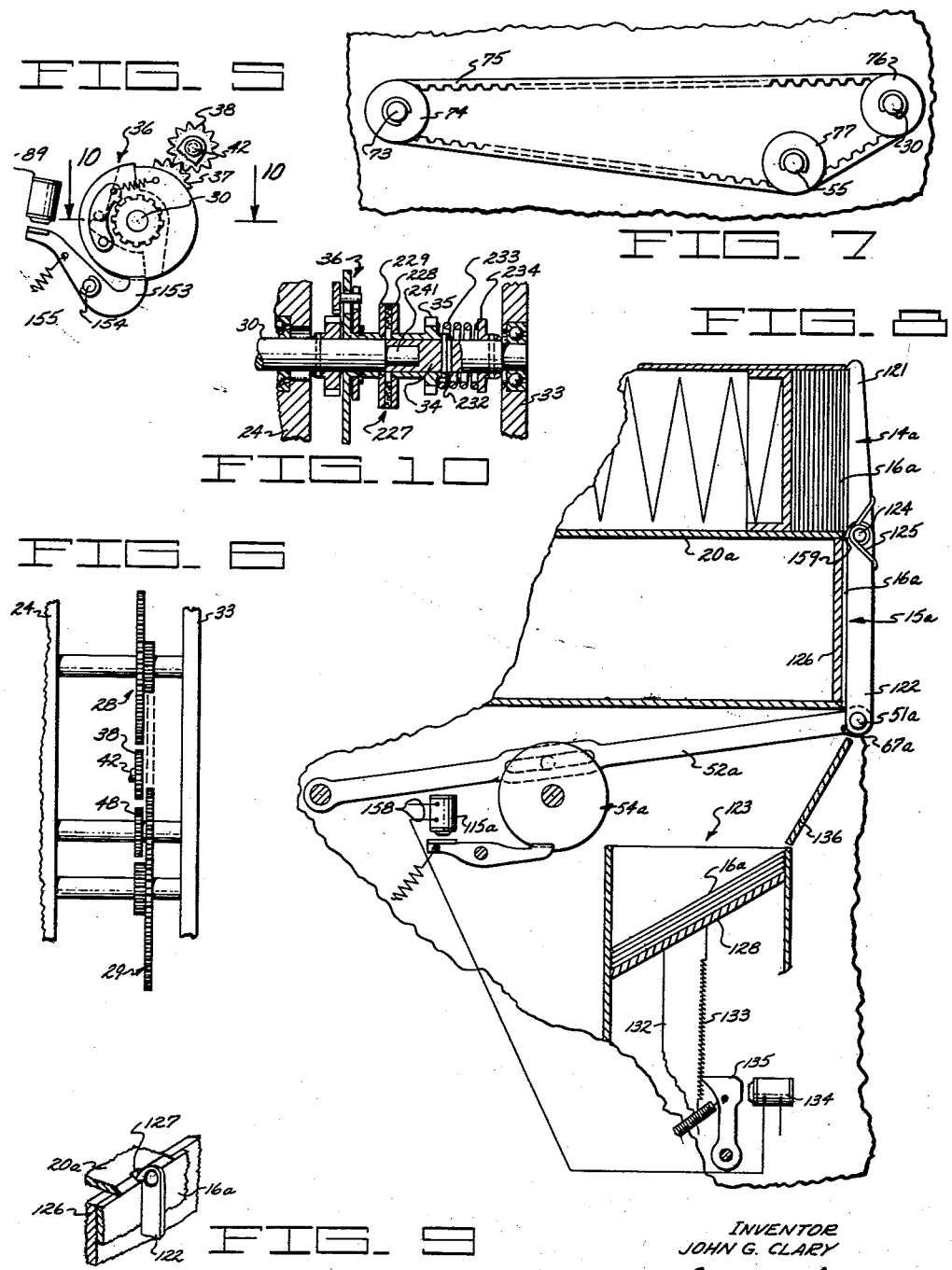

United States Patent Office 3,079,712
Patented Mar. 5, 1963

3,079,712
MEDIA DISPLAY APPARATUS
John G. Clary, Pasadena, Calif., assignor to Clary Corporation, San Gabriel, Calif., a corporation of California
Filed Mar. 13, 1961, Ser. No. 95,215
11 Claims. (Cl. 40—36)

This invention relates to apparatus for pacing and/or training workers in performing relatively complicated tasks which include a large number of operations.

Considerable difficulty has been experienced heretofore in training workers to assemble and wire relatively complicated electronic equipment such as electronic computers, data processing systems, etc., especially in mass production. This is so because of the large number of parts involved and the maze of wiring connections generally found in such equipment.

It has been discovered that the best way to overcome the above problems is to break down the procedure of assembling and wiring into sets of simple instructions so that the worker has only to consider one or, at most, a few steps at a time.

It is also desirable, in mass production procedure, to keep track of the worker's progress so that he and/or his supervisors can be apprised of his speed and efficiency at all times.

A principal object of the present invention is to provide a pacing and/or training apparatus of the above type wherein a complicated series of operations is broken down into relatively simple sets of instructions which the operator can follow at a time.

Another object is to provide an apparatus of the above type in which the worker is timed in accordance with the particular step or series of steps which he is currently working on.

Another object is to provide a pacing and/or training apparatus which induces the worker to perform tasks at a predetermined rate of speed.

Another object is to provide a pacing and/or training apparatus of the above type in which the required elapsed period of time for performing each of a series of instructions can be readily changed.

A further object is to provide a pacing and/or training apparatus which sets off an alarm if the worker fails to perform required operations in a given period of time.

Another object is to provide a relatively simple and inexpensive pacing and/or training apparatus of the above type.

The manner in which the above and other objects of the invention are accomplished will be readily understood on reference to the following specification when read in conjunction with the accompanying drawings, wherein:

FIG. 5 is a side elevation view showing the clutch arrangement.

FIG. 6 is an extended plan view of the gear train for driving the timing rack and is taken substantially along the line 6—6 of FIG. 3.

FIG. 7 is an elevational view illustrating the driving connection between the motor and the rack advancing and card advancing means.

FIG. 8 is a view illustrating an alternate form of storing device for storing the cards after use.

FIG. 9 is a perspective partial sectional view showing the card detenting means of the alternate form shown in FIG. 8.

FIG. 10 is a transverse sectional view through the clutching arrangement and is taken substantially along the line 10—10 of FIG. 5.

Figure 1:
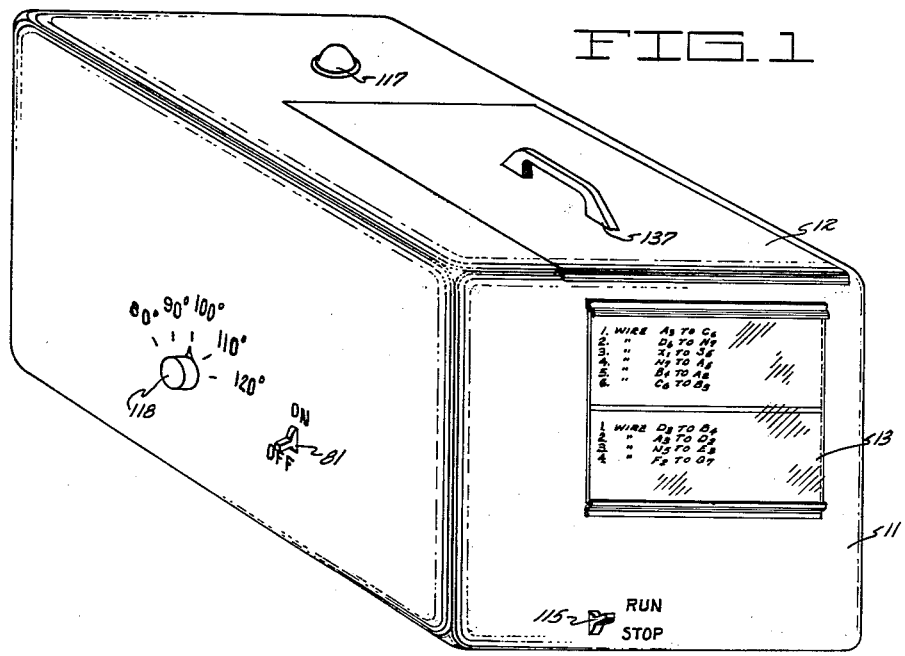
FIG. 1 is a perspective view of a machine embodying a preferred form of the invention.
Figure 2:
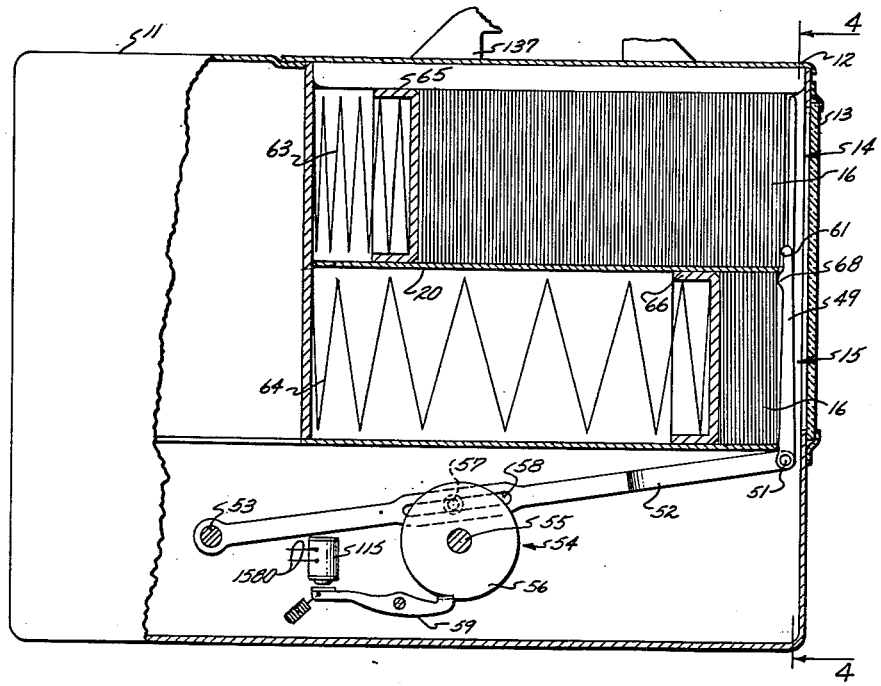
FIG. 2 is a longitudinal sectional view showing the card stacking and advancing means and is taken along the line 2—2 of FIG. 4.

Referring to FIGS. 1 and 2, it can be seen that the present invention is embodied in a cabinet 11 having a removable container 12 mounted therein directly behind a viewing window 13. The latter is mounted in a front panel of the cabinet 11.

The container 12 is divided into two chambers 14 and 15 which are enclosed on three sides while the fourth side, the side adjacent the window 13, is open. The chamber 14 is for the storage of cards 16 yet to be viewed in the window 13, and the chamber 15 is for the storage of cards 16 having already been viewed. The chambers are separated by a plate 20 suitably connected to the three sides of the container 12.

Figure 4:
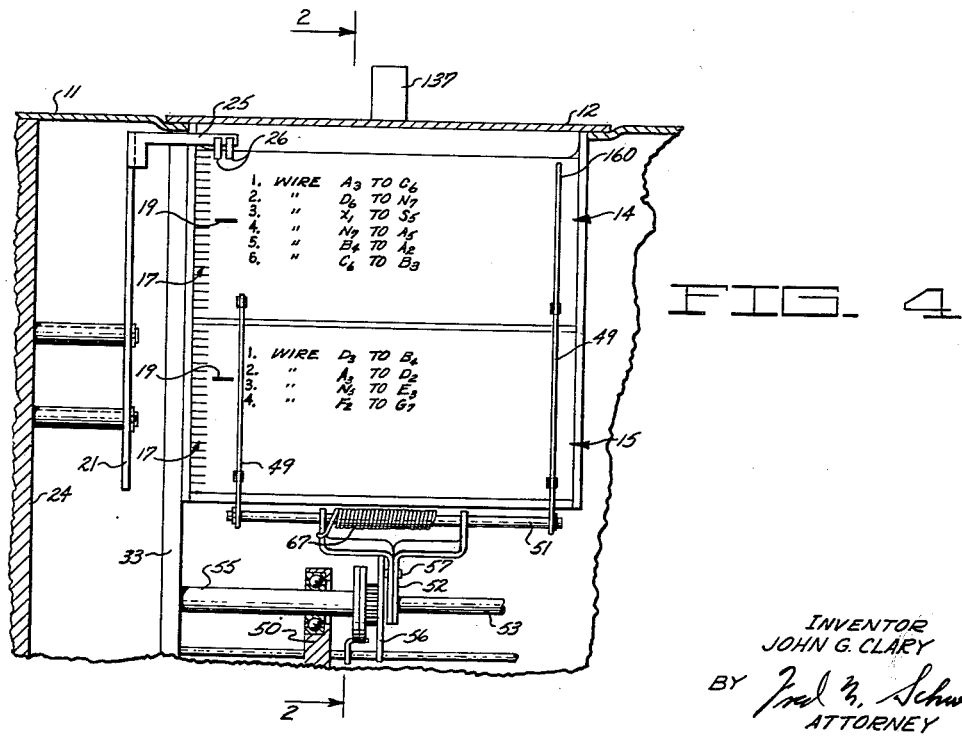
FIG. 4 is a sectional elevational view illustrating the timing means associated with the cards and is taken substantially along the line 4—4 of FIG. 2.

The cards 16 have printed thereon a list of instructions to be followed by an operator, such as those illustrated in FIG. 4, for the wiring of electrical circuitry. Also printed on the card 16 along the left-hand side thereof is a timing scale 17 representing a series of time intervals which, in the present embodiment, represent two minute intervals, but could be varied to represent any desired length of time, as will appear later.

An electrically conductive control mark 19 is positioned adjacent the scale 17 at a point representative of the time considered appropriate to complete the instructions of the respective card 16. The mark is placed on the card with a relatively soft pencil, such as an I.B.M. "Electrographic" pencil, to make a good conductive contact.

Figure 3:
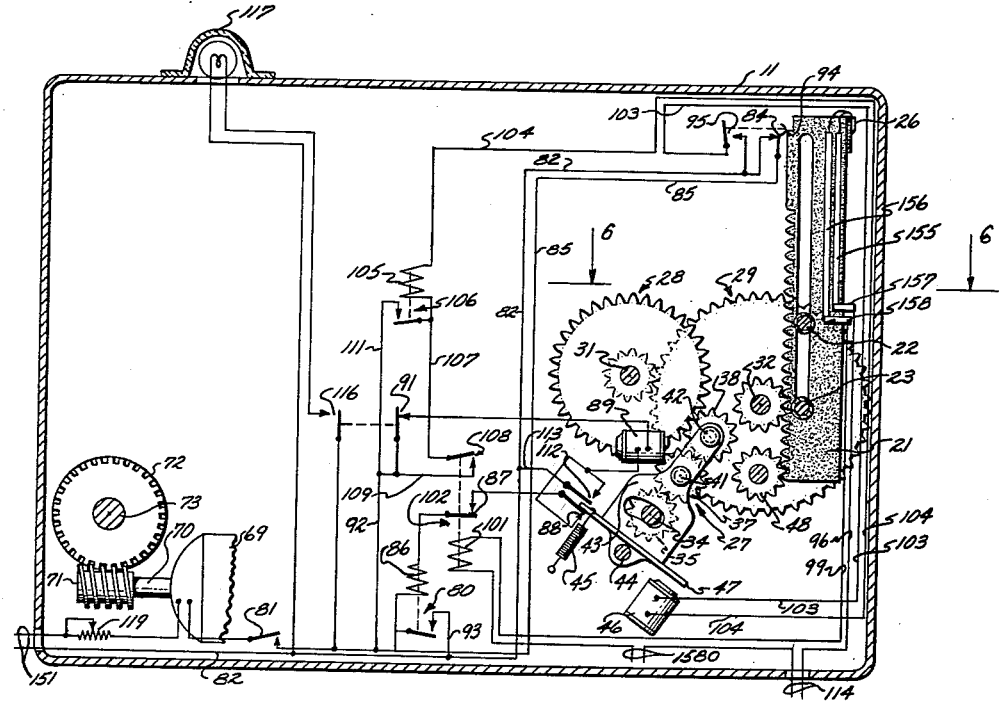
FIG. 3 is a schematic view of the clutch control circuitry.

A rack 21, FIGS. 3 and 4, of plastic or other insulating material, is slideably mounted on a pair of pins 22 and 23, rigidly fixed to a support plate 24, and has an extension arm 25 which carries a set of spaced flexible contacts 26. The contacts 26 will control certain functions of the machine upon establishing a circuit through the mark 19, as will be described later. The contacts 26 are electrically connected to respective ones of a set of conductive strips 155 and 156 and a set of brushes 157 and 158.

The drive assembly for the rack 21 comprises a pivotal train of gears generally indicated at 27 which, at one time, mesh with the larger element of a compound gear 28. The smaller element of the compound gear 28 meshes with the larger element of a second compound gear 29, and the smaller element of the second compound gear 29 meshes with the rack 21 for driving the rack in a downward direction. The compound gears 28 and 29 are rotatably mounted on respective fixed cross shafts 31 and 32 mounted in support plates 24 and 33.

The pivotal train of gears 27 comprises a gear 35 mounted through a pin and slot connection 232 to a shaft 34. The gear 35 is connected through a friction device, to be described later, to the driven side of a cyclic clutch assembly 36 supported on a shaft 30. The latter shafts 30 and 34 are axially aligned and each is suitably supported in a bearing mounted in respective support plates 24 and 33. The shaft 30 has a pilot bearing portion 241 rotatable in a bearing formed in the shaft 34.

The clutch 36 is normally maintained in disengaged condition, as shown in FIG. 5, by a clutch dog 153 fulcrumed at 154 and urged into engagement with the periphery of the clutch by a spring 155.

Rotation of the gear 35, upon engagement of the clutch 36, drives a gear 38 through an idler gear 37. The said gears 37 and 38 are rotatably mounted on respective pins 41 and 42 which are attached to an arm 43, the arm 43 being pivotally mounted on a cross shaft 44 which is suitably supported in support plates 24 and 33.

The arm 43 is normally urged in a counterclockwise direction by a tension spring 45, thereby normally retaining the gear 38 in mesh with the gear 28. Therefore, when the clutch 36 is engaged to drive the gear 37 clockwise, the aforesaid gearing will be effective to drive the rack 21 in a downward direction from its illustrated home position at a predetermined rate of speed until the contacts 26 are shorted across by the mark 19, at which time disengagement of the clutch 36 is effected through circuitry to be described later.

An electromagnet 46 is so mounted on the support plate 24 as to be positioned beneath an extension 47 of the arm 43, the extension thereby acting as the armature for the magnet 46.

After the clutch 36 is disengaged, current is applied through the magnet 46 thereby rocking the arm 43 in a clockwise direction, demeshing the gear 38 from the gear 28 and meshing it with a gear 48. The latter is rotatably mounted on a fixed shaft 150 and meshes with the rack 21. Thus, when the clutch is again engaged to drive the gear 37 clockwise, this second gear train will drive the rack 21 up to its home position at a rate approximately 12 times faster than the rack originally descended; it being noted that this ratio is for disclosure purposes only and that different ratios may be used depending upon the desired time requirements.

To prevent jamming of the rack or stripping of the teeth thereon due to a malfunction of the machine or an overthrow of the rack on its return movement, there is provided a friction clutch 227 between the driven shaft 34 of the gear train 27 and the driven side of the clutch 36 which is mounted on the drive shaft 30.

The driven side of the friction clutch 227 comprises a disc 228 which is mounted on a hub 230 of the gear 35. The disc 228 and gear 35 are connected to the shaft 34 for axial movement through the pin and slot connection 232 and are normally urged to the left, FIG. 10, by a compression spring 233 positioned between a flange 234 mounted on the shaft 34 and the gear 35.

The driving side of the friction clutch comprises a disc 229 having a suitable friction facing thereon. The disc is mounted on a hub 235 of the driven side of the clutch assembly 36 so that, should stoppage of the rack occur before disengagement of the clutch 36, the disc 228, through the gear 35, will tend to compress the spring 233, thereby allowing the disc 229 and the clutch 36 to rotate to its disengaging position without further driving of the gear 35.

It should be noted that the slot for connecting the gear 35 to the shaft is only slightly elongated so that the gear 35 can move axially but only to a certain extent, thereby retaining it in mesh with the gear train 27.

A pair of picker arms 49, FIGS. 2 and 4, are securely attached to the opposite ends of a rod 51, the rod being pivotally mounted in a pair of arms 52a and 52b at the forward end of a bifurcated lever 52 which is pivotally mounted at its opposite end on a cross shaft 53.

A second cyclic clutch assembly 54 is mounted on a continuously rotating shaft 55, juxtaposed to the lever 52, and carries on its driving side a pin 57. The clutch is normally maintained in disengaged condition by a clutch dog 59 spring urged into engagement with the periphery thereof. The pin 57, being mounted at right angles to the disc 56 and the lever 52, passes through a slot 58 in the lever, so that upon rotation of the clutch disc 56, the lever 52 will be reciprocated and the picker arms 49 having shoulders 61 will engage slots 62 in the foremost card 16 and pull such card from the chamber 14 down to the front card position of the chamber 15.

The shaft 55 is suitably supported in bearings carried by the plate 33 and a support stand 50, the stand being suitably mounted to the base of the container 12.

It should be noted at this point that the previously mentioned clutch assemblies 36 and 54 are basically similar to the clutch shown and described in Patent No. 2,515,692 issued to R. E. Boyden et al. on July 18, 1950, except that the present clutches are driven by their respective shafts when engaged whereas the clutch in the above patent drives its shaft when engaged.

The cards in both chambers 14 and 15 are urged toward the front or open ends by compression springs 63 and 64 acting against respective hollow blocks 65 and 66 which are slidable in their respective chambers.

The pickers 49 are urged in a counterclockwise direction by a torsion spring 67, FIG. 4, connected between the rod 51 and the lever 52 to thereby maintain constant pressure against the cards so that the shoulder 61 on each picker will engage the cards and a second protruding shoulder 68 of the pickers will hold the cards in the chamber 15 slightly inclined so that a card coming down from the upper chamber 14 will slide into the foremost position of the chamber 15.

The main drive for the individual drive shafts 30 and 55 comprises a motor 69, FIG. 3, whose output shaft 70 carries a worm 71 which drives a worm gear 72 attached to a shaft 73. A drive pulley 74, FIG. 7, on the shaft 73 drives pulleys 76 and 77 on the aforementioned shafts 30 and 55, respectively, through an endless belt 75.

Following through an operation of the machine, the operator first closes a switch 81, FIGS. 1 and 3, which completes a circuit path from one side of a power supply 151, through line 82, a first set of normally open spring contacts 84 (normally closed by the rack 21 when in its home position), line 85, coil 86 of a self-locking relay 80, a second set of normally closed contacts 87 of a relay 102, the normally closed side of a switching contact 88, the magnet 89 of the clutch 36, a third set of normally closed contacts 91, line 92, switch 81, motor 69 and rheostat 119 to the opposite side of the power supply. The completion of this circuit causes the motor to operate and energizes the magnet 89, thereby releasing the clutch dog 153 to cause engagement of the clutch 36 to drive the rack 21 downwardly at a rate of speed determined by the setting of the rheostat 119.

It should be noted at this point that as the rack moves downwardly, a shoulder 94 of the rack moves away from the spring contacts 84 allowing them to open, and at the same time allowing a set of contacts 95 to close. However, opening of the contacts 84 will not open the aforementioned circuit because when the coil 86 was energized, as described above, it closed the contacts of the self-locking relay 80, thereby shorting out over a line 93 to line 82 and eliminating the need for the contacts 84.

The rack will continue moving downwardy until the open contacts 26 are shorted across by the control mark 19 which completes a circuit from one side of a power supply 114, through line 96, brush 157, strip 155, contacts 26, strip 156, brush 158, line 99, a coil 101 of a relay 102, leads 158Ø (see also FIG. 2) of an electromagnet for clutch 54, and back to the opposite side of the power supply. The completion of this circuit after the predetermined length of time determined by the positioning of the mark 19 energizes the coil 101 to open the normally closed contacts 87 of the relay 102 which opens the circuit to the clutch magnet 89, thereby disengaging the clutch 36 and stopping the downward movement of the rack 21.

Since the initial downward movement of the rack closed the normally closed contacts 95, a circuit is now completed through the line 82, contacts 95, line 103, magnet 46, line 104, coil 105 of a self-locking relay 106, line 107, now closed contacts 108, and out a line 109 to the line 92. The completion of this circuit energizes the coil 105 closing the contacts of the self-locking relay 106, allowing the circuit to short across to the line 92 over a line 111.

The above described circuit also energizes the magnet 46 which rocks the arm 43 clockwise demeshing the gear 38 from the gear 28 and meshing it with the gear 48. As the arm 43 pivots clockwise, it will also break the contacts 88 and make contacts 112 which complete a circuit from the line 82 through a line 113, contacts 112, clutch magnet 89, normally closed contacts 91 to the line 92, thereby energizing the magnet 89 to effect engagement of the clutch 36, thereby causing the gear 48 to drive the rack back to its home position.

Since the magnet 115 for controlling the picker arm clutch 54 is in series with the coil 101, closing of the circuit across the contacts 26 by the conducting line 19 will effect engagement of the clutch 54 for one cycle to operate the picker arms 49 and thus bring the foremost card 16 from viewing position in chamber 14 down to viewing position in the chamber 15. This will enable a new set of instructions to be viewed in the upper half of the window 13.

If the operator had not quite finished with the previous card, it still can be viewed in the lower half of the window 13.

Should an operator fall behind during an operation, he merely moves a lever 115, FIG. 1, to "stop" position which opens the normally closed contacts 91, FIG. 3, thereby opening the circuit to the magnet 89 which will disengage the clutch 36, stopping the machine. The opening of the contacts 91 will also close a set of contacts 116 to ignite a lamp 117, thereby indicating to an instructor or a supervisor when the operator is having more than an average amount of trouble.

To compensate for the variations in different operators' speeds, there is positioned on the side of the cabinet 11 a knob 118 which controls the variable rheostat 119, FIG. 3. This rheostat controls the speed of the motor 69 so that an operator or his instructor may set the knob at the calibration most suited to the individual. Any adjustment in speed of the motor, in effect, changes the increments of time represented by timing marks 17 on the cards.

FIGURES 8 and 9 illustrate an alternate form of the invention wherein the picker elements 49a are each of a two piece construction having an upper arm 121 for drawing the foremost card 16a from the chamber 14a down to the chamber 15a and a lower arm 122 mounted on a rod 51a for concurrently drawing the foremost card from the chamber 15a to a deposit container 123. The two arms 121 and 122 are pivotally connected through a pin 124, and a torsion spring 125 tends to pivot the arm 121 counterclockwise about the pin. A second spring 67a, similar to spring 67 of FIG. 4, is connected between lever 52a and arms 122, thereby applying a pressure against the cards 16a.

The chamber 15a in this form of the invention has a guide plate 126 which acts as a backstop for the cards when they are located in the lower position of the viewing window.

The separator plate 20a in this form of the invention protrudes beyond the plate 126, FIG. 9, an amount equal to approximately the thickness of a card 16a and is notched at 127 to allow a shoulder at the upper end of each of the pickers to engage the top edge of the card. The protrusion of the plate 20a prevents the card from being pushed upward by the friction of the pickers as they are returned to their neutral position. Also, the upper end of each of the arms 122 has a shoulder 159 thereon engageable with the top edge of a card in the lower chamber 15a.

The container 123 is comprised of a sloping table 128, slideably retained between a pair of plates 129 and 131 suitably attached to the machine base. The table 128 is retained in its upper position by a guide stem 132 which is attached to the table at one end and slideably guided at its opposite end.

The stem 132 has a set of ratchet teeth 133 which cooperate with an electromagnet 134 and pawl 135 forming part of a suitable escapement means to step the table downwardly once during each machine cycle, the spacing of the teeth 133 preferably being equivalent to the thickness of a card 16a.

Following through an operation, a pulse, when applied over the lines 158a, will energize the magnet 115a to engage the clutch 54a for one cycle so that, through the lever 52a, the picker assembly will start to lower the foremost cards from both chambers, and since the magnet 134 is in series with the magnet 115a, it also will be energized by the pulse to lower the table one step through the escapement means, or one card thickness, so that as the picker arms 122 draw the lower card 16a to a certain point, the card will drop free of the arm and fall onto a slide 136 which guides the card into the container 123. At the same time, the picker arms 121 will slide the front card in chamber 14a down into its new position in the chamber 15a.

The advantage of this modification over the previously described storage means is that the cards will be stacked in order for immediate re-use.

In FIGURES 3 and 4, it will be noted that the picker arm 49, situated on the left-hand side of the machine, is extended up toward the top of the machine as shown at 160. Thus, when an operator has finished with a particular set of cards, he merely grips a handle 137 of the container 12 and lifts the container up slightly so that he can reach in with a finger and pull back on the extension 160 so that the shoulder 61 of the arms 49 will not engage or tear a card as the container is removed from the cabinet 11.

Although the invention has been described herein in detail and certain specific terms and languages have been used, it is to be understood that the present disclosure is illustrative rather than restrictive and that changes and modifications may be made without departing from the spirit or scope of the invention as set forth in the appended claims. For example, the term "card" in the claims is intended to define any thin, media-bearing element whether flexible or inflexible.

Having thus described the invention, what is desired to secure by United States Letters Patent is:

1. Apparatus of the character described comprising the combination of a container containing a plurality of information-bearing cards arranged to successively move into a viewing position, means on each of said cards for indicating a predetermined elapsed period of time, and means controlled by the said last mentioned means on a card which is in viewing position for locating another of said cards into viewing position.

2. Apparatus of the character described comprising the combination of a container containing a plurality of information-bearing cards arranged to successively move into a viewing position, control means on each of said cards for indicating by its location relative to a reference point a predetermined elapsed period of time, sensing means movable along the said card which is in viewing position, and means controlled by said sensing means upon sensing said control means on said last mentioned card for moving said last mentioned card out of said viewing position.

3. Apparatus of the character described comprising the combination of a container for carrying a plurality of information-bearing cards, one of said cards being in a viewing position, electro-conductive means on each of said cards indicating by its location relative to a reference point a predetermined elapsed period of time, control means including a normally open circuit effective upon closing to move another of said cards into said viewing position; a circuit closing device in said circuit, and means for moving said device over the said card which is in viewing position, said device being effective to complete said circuit upon engaging said electro-conductive means.

4. Media display apparatus comprising the combination of a container for carrying a plurality of stacks of information-bearing cards, the foremost card of each stack being visible through a viewing opening in said container, means on each of said cards for indicating a predetermined elapsed period of time, and means controlled by the said last mentioned means on the said foremost card for moving said foremost card into a position still visible through said opening but uncovering the next successive card of said stack for viewing through said opening.

5. Media display apparatus comprising the combination of a container for carrying a plurality of stacks of information-bearing cards, the foremost of said cards being arranged in a viewing position, means on each of said cards for indicating by its location relative to a reference point a predetermined elapsed period of time, sensing means movable from said reference point along the said card which is in viewing position, and means controlled by said sensing means upon sensing the said control means on said last mentioned card for moving said foremost card from said stack to present the next successive card in said viewing position.

6. Media display apparatus comprising the combination of a container for carrying a plurality of stacked information-bearing cards, the foremost of said cards being arranged in a viewing position, control means on each of said cards for indicating by its location relative to a reference point a predetermined elapsed period of time, sensing means for said control means, means for advancing said sensing means at a predetermined rate of speed from said reference point along the said foremost card, means controlled by said sensing means upon sensing the said control means on said foremost card for moving said foremost card from said stack to present the next successive card in said viewing position and for returning said sensing means to said reference point, and means responsive to said return of said sensing means for causing operation of said advancing means.

7. Media display apparatus according to claim 6 comprising means for changing said predetermined rate of speed whereby to change said elapsed period of time.

8. Media display apparatus comprising the combination of a container carrying a plurality of stacked information-bearing cards, the foremost of said cards being arranged in a viewing position, means on each of said cards for indicating a predetermined elapsed period of time by its location relative to a reference point, sensing means for said indicating means, means for advancing said sensing means at a predetermined rate of speed from said reference point along the said foremost card, means controlled by said sensing means upon sensing the said indicating means on said foremost card for moving said foremost card from said stack to a second viewing position and to present the next successive card on said stack in said viewing position, further means controlled by said sensing means upon sensing said indicating means on said foremost card for returning said sensing means to said reference point, and means responsive to said return of said sensing means for causing operation of said advancing means.

9. Media display apparatus according to claim 8 comprising means for selectively disabling said advancing means, an alarm device, and means responsive to said disabling device upon operation thereof for causing operation of said alarm device.

10. Media display apparatus comprising the combination of a container carrying a plurality of stacked information-bearing cards, the foremost of said cards being arranged in viewing position, means on each of said cards indicating a predetermined elapsed period of time by its location relative to a reference point, means including a first clutch for moving said foremost card from said stack whereby to present the next successive card in said viewing position; sensing means for said indicating means, means including a second clutch and a first gear train for advancing said sensing means at a predetermined rate of speed from said reference point along the said foremost card; means including said second clutch and a second gear train for returning said sensing means to said reference point; means responsive to said sensing means upon sensing said indicating means for causing engagement of said first clutch and said second clutch and for enabling said second gear train, and means responsive to said sensing means upon return thereof to said reference point causing engagement of said second clutch and for enabling said first gear train.

11. Media display apparatus comprising the combination of a container carrying a plurality of information-bearing cards, one of said cards being located in a viewing position, means on each of said cards indicating a predetermined elapsed period of time by its location relative to a reference point, means including a first clutch for causing another of said cards to be located in said viewing position; sensing means for the indicating means on said card which is in said viewing position, means including a second clutch and a first gear train for advancing said sensing means from said reference point along the said card in said viewing position; means including said second clutch and a second gear train for returning said sensing means to said reference point; means responsive to said sensing means upon sensing the indicating means on said card in said viewing position for causing engagement of said first clutch and said second clutch and for enabling said second gear train, and means responsive to said sensing means upon return thereof to said reference point for causing engagement of said second clutch and for enabling said first gear train.

References Cited in the file of this patent

UNITED STATES PATENTS

| 1,322,175 | Birdsall | Nov. 18, 1919 |
| 2,696,688 | Hilgeson | Dec. 14, 1954 |
| 2,957,259 | Steinman | Oct. 25, 1960 |

FOREIGN PATENTS

| 480,229 | Great Britain | Feb. 18, 1938 |
| 96,024 | Sweden | June 20, 1939 |